United States Patent [15] 3,670,388
Jack [45] June 20, 2972

[54] SELF-TESTING INSERTION TOOL AND METHODS OF INSERTING WORKPIECES

[72] Inventor: Ronald H. Jack, Rolling Meadows, Ill.
[73] Assignee: Teletype Corporation, Skokie, Ill.
[22] Filed: Dec. 29, 1969
[21] Appl. No.: 888,730

[52] U.S. Cl. ................................29/244, 29/206, 74/102, 74/110, 173/4
[51] Int. Cl. ........................................B23p 19/04
[58] Field of Search ..............29/407, 244, 206; 74/102, 103, 74/88, 128, 110, 104, 105; 173/53, 121, 4

[56] References Cited

UNITED STATES PATENTS 3,074,155  1/1963  Cootes ...................................29/206
3,177,952  4/1965  West .....................................173/121
3,181,626  5/1965  Sussman .................................173/53

Primary Examiner—John F. Campbell
Assistant Examiner—Donald P. Rooney
Attorney—J. L. Landis and R. P. Miller

[57] ABSTRACT

A workpiece insertion tool includes a shaft for engaging the workpiece, a housing slidably mounted on the shaft, a spacer integrally attached to the shaft, an elastic member between the housing and the spacer, and a blocking member. To insert a workpiece into a workpiece-receiving member a force is applied to the housing. The elastic member initially operates to transmit the force to the spacer and therefore to the shaft so as to apply a gradually increasing force tending to insert the workpiece. Failure of the elastic member to compress to a predetermined extent, before a predetermined movement of the workpiece into the receiving member occurs, operates to bring the blocking member into engagement with the housing to immobilize the tool and to prevent complete insertion of the workpiece. Whenever the elastic member does compress sufficiently, further force is applied to the housing and shaft to complete the insertion.

11 Claims, 3 Drawing Figures

PATENTED JUN 20 1972 3,670,388

INVENTOR
RONALD H. JACK

BY J. L. Landis
ATTORNEY

SELF-TESTING INSERTION TOOL AND METHODS OF INSERTING WORKPIECES

BACKGROUND OF THE INVENTION

The present invention relates generally to insertion tools and methods of inserting workpieces into a workpiece-receiving member, and in particular to a self-testing insertion tool which operates to immobilize itself if a predetermined minimum force is not required to insert a workpiece.

Generally, workpiece-insertion tools of the self-testing variety are designed to determine that a minimum retentive force exists between a press fit workpiece and a receiving member into which the workpiece has been inserted. This is done to ensure that later manipulation or jarring of the workpiece will not readily remove it from its seat. Typically, the insertion tool exerts a withdrawal force on the workpiece after it has been seated to ensure that a predetermined minimum force will not withdraw the workpiece from its seat. If the workpiece resists removal when the required minimum withdrawal force is applied, the insertion tool operates to release the workpiece; if not, the insertion tool removes the workpiece from its seat.

Of necessity, the insertion tool must be of a complex design. The workpiece-engaging end of the tool must be capable of retaining a grip on the workpiece so that a withdrawal force may be exerted, and must be capable of releasing its grip on the workpiece if the workpiece resists removal under the minimum required withdrawal force. Also, design details may have to be added to a workpiece to allow the tool to maintain a grip on it when exerting a withdrawal force, when otherwise, but for accommodating the tool, the workpiece could be of a simpler design.

It has been determined that the force required to withdraw a press-fit workpiece from a receiving member is an increasing function of the force required to insert the workpiece into the member. Therefore, to achieve a predetermined minimum retaining force between the receiving member and a workpiece, a predetermined minimum inserting force may be established such that, if any force less than said minimum force is capable of inserting the workpiece, it is an indication that an unacceptable press fit would exist if the operation were completed. It is upon the relationship of said withdrawal force to said insertion force that the present invention is based.

A specific object of the invention is to provide a self-testing insertion tool with which the force required to insert a workpiece into a receiving member, rather than the withdrawal force, is used as an indication of the retentive force of the press fit. Another object is to provide such a tool where the insertion operation may be arrested whenever the predetermined force condition has not been met, so as to prevent complete formation of unsatisfactory assemblies.

A further object of the invention is to provide a self-testing insertion tool having a workpiece-engaging end of a noncomplex design, such as a flat end of a shaft, and being capable of operating with workpieces of both a complex and a noncomplex design.

SUMMARY OF THE INVENTION

The foregoing and other objects of the invention are accomplished by providing a member for pushing the workpiece into a receiving member. To operate upon the workpiece, a force is applied to the pushing member and thereby to the workpiece. If a predetermined minimum insertion force to push the workpiece a predetermined distance into the receiving member, to ensure adequate retention of the workpiece, is not encountered, the pushing member is immobilized to prevent complete insertion of the workpiece.

Preferably, the pushing member comprises a shaft for pushing the workpiece, a housing slidably mounted on the shaft to which the force is applied, a spacer integrally fixed to the shaft, and a coil spring extended between the housing and the spacer and compressible to transmit the force applied to the housing to the spacer. A blocking member having a housing-engaging slot is provided to immobilize the housing if the minimum insertion force is not met. The housing and the spacer normally engage the blocking member to hold the slot of the blocking member out of engagement with the housing. When a force is applied to the housing to insert the workpiece, the housing moves toward the spacer, compressing the spring which then exerts an increasing force against the spacer tending to insert the workpiece. If the spring force is equal to or above the minimum required workpiece-insertion force before the workpiece has moved the predetermined distance, as a result of a predetermined travel of the housing, the device operates to maintain the housing-engaging slot out of engagement with the housing and therefore prevents immobilization of the tool. However, failure of the spring to compress with a force at least equal to the minimum required insertion force, as a result of a failure of the housing to travel the predetermined distance prior to movement of the workpiece beyond its predetermined distance, operates to bring the housing-engaging slot into engagement with the housing, and therefore operates to immobilize the tool and prevent insertion of the workpiece.

Other objects, advantages and features of the invention will be apparent from the following detailed description of specific embodiments thereof, when taken in conjunction with the appended drawings.

DETAILED DESCRIPTION

Figure 1:
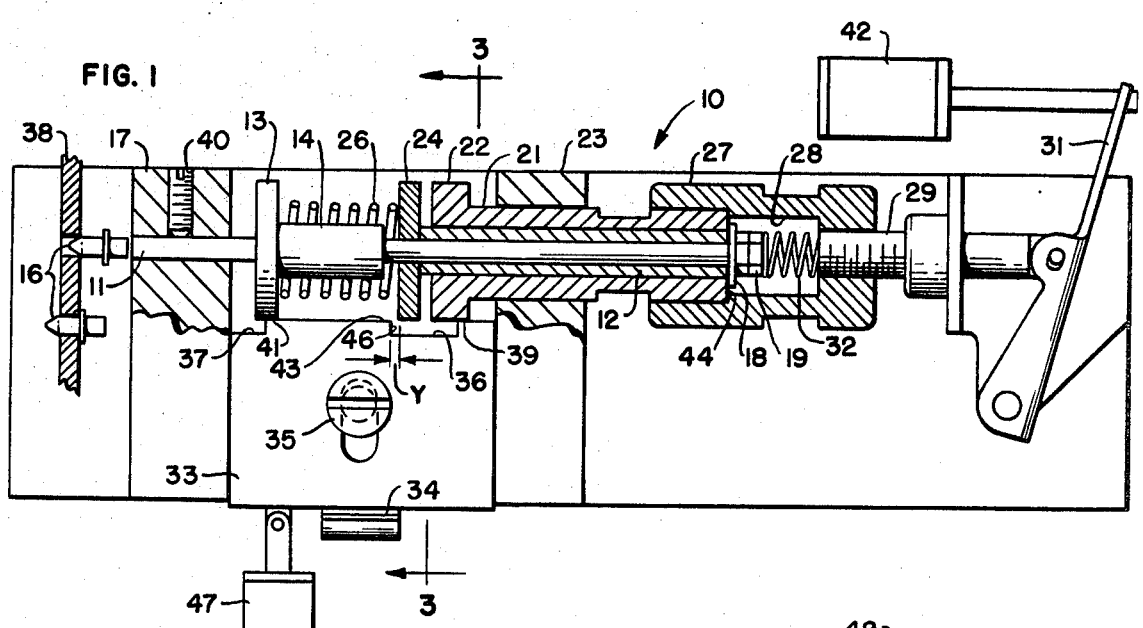
FIG. 1 of the drawings is a longitudinal view, partly in section, illustrating the insertion tool in a retracted position prior to insertion of a workpiece.

The specific embodiment of an insertion tool 10 shown in the drawings includes a shaft 11 having a sleeve 12 slidably mounted on it, and a spacer 13 with a sleeve 14 integrally attached to it. The left end of the shaft 11, as viewed in FIG. 1, operates to engage a workpiece 16 and is slidably contained within a mounting member 17. At the other end of the shaft 11 a washer 18, having a larger diameter than the sleeve 12, is maintained between the sleeve 12 and two nuts 19 which are in threaded engagement with the shaft 11.

A cylindrical housing 21 having an enlarged cylindrical end 22 is slidably mounted on the sleeve 12 such that the left end of the housing 22, as viewed in the drawings, extends toward the spacer 13, and therefore the workpiece 16. The housing 21 is in turn slidably supported by a mounting member 23. A sliding spacer 24, which is slidably mounted on the shaft 11, is normally urged into engagement with the left end of the sleeve 12 by a coil spring 26 which is positioned between the spacer 13 and the sliding spacer 24. A housing-engaging member 27, having an inner cylindrical chamber 28, is fixed to the housing 21, and accommodates within the chamber 28 the washer 18, the nuts 19, and a portion of the shaft 11 and the sleeve 12. The other end of the housing engaging member is threadably attached to a drive shaft 29 which may be driven to the right or to the left by a force applied to a handle 31. A compressed coil spring 32 is also maintained within the chamber 28 and is positioned between the nuts 19 and the right-hand of the chamber 28.

Figure 3:
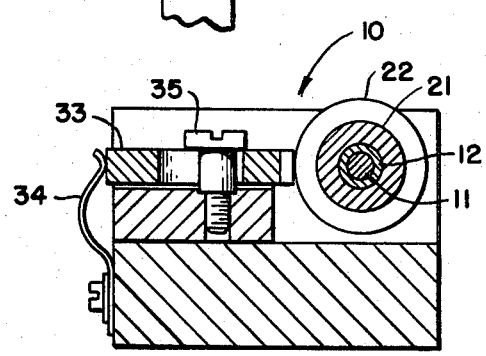
FIG. 3 is a sectional view taken along the line 3—3 of FIG. 1, and illustrates the shape of certain parts of the tool.

A blocking member 33 is slidably mounted on the tool 10 with a screw 35, and at various times is urged into engagement one or more of the spacer 13, the sliding spacer 24 and the enlarged cylindrical end 22 of the housing 21 by a leaf spring 34, the leaf spring 34 being shown most clearly in FIG. 3 of the drawings. The blocking member 33 has two slots 36 and 37, the first slot 36 having a width greater than the combined widths of the enlarged end 22 and the sliding spacer 24, and the slot 37 having a width greater than the width of the spacer 13. Therefore, if the enlarged cylindrical end 22 and the sliding spacer 24 are moved leftwardly as shown in FIG. 1 of the drawings into alignment with the slot 36, and if the spacer 13 is moved leftwardly into alignment with the slot 37, the blocking member 33 will be urged by the leaf spring 34 upwardly such that the slot 36 will engage the enlarged cylindrical end 22 and the sliding spacer 24 and such that the slot 37 will engage the spacer 13.

OPERATION

In use, the shaft 11 of the tool 10 is aligned coaxially with the workpiece 16, such as a core, which is to be force or press fitted into a workpiece receiving member 38. As best shown in FIG. 1 of the drawings, when the tool 10 is in a retracted position prior to an insertion operation, the enlarged cylindrical end 22 of the housing 21 is in engagement with a flat surface 39 of the blocking member 33, and the spacer 13 is in engagement with a flat surface 41 of the blocking member 33, thereby preventing upward movement of the blocking member 33 under the urging of the leaf spring 34.

To press fit the workpiece 16 into the receiving member 38, a force is applied to the handle 31 by any suitable means, such as a solenoid 42, which tends to drive the shaft 11 leftwardly as shown in the drawings. The force applied by the solenoid 42 to the handle 31 is applied through the drive shaft 29 and the housing engaging member 27 to the housing 21, sliding the housing 21 forward to engage the sliding spacer 24 and to thereby compress the coil spring 26 between the sliding spacer 24 and the spacer 13. In a first or testing phase of operation, the coil spring 26 transfers a gradually increasing portion of the force to the spacer 13, and thereby to the shaft 11 and the workpiece 16. Similarly, the coil spring 32 operates to directly transfer a gradually increasing portion of the force applied by the drive shaft 29, to the nuts 19, and thereby to the shaft 11 and the workpiece 16. However, the coil spring 32 is primarily used to return the housing 21 to a retracted position after an insertion operation, as will be explained later, and the insertion force exerted on the workpiece 16 which is attributable to the spring 32 is negligible and will not hereafter be considered as a significant force in the inserting operation.

Figure 2:
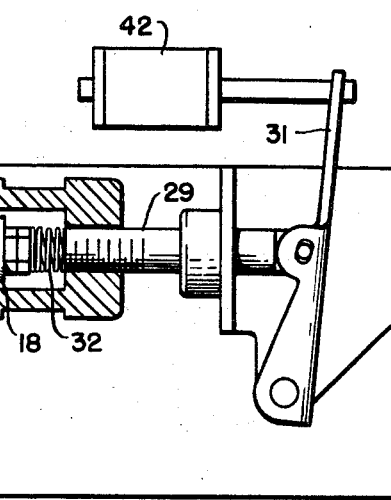
FIG. 2 of the drawings is a longitudinal view, partly in section, illustrating the insertion tool in the operative position immediately prior to insertion of the workpiece.

If there is initially sufficient resistance between the workpiece 16 and the receiving member 38 to ensure an acceptable press fit, the workpiece 16 will not begin to enter the receiving member 38 when the force is first applied, or will enter only very slightly; but rather, the housing 21 and spacer 24 will move to the left, initially compressing the spring 26 between the sliding spacer 24 and the spacer 13. When the housing 21 moves to the left, the enlarged cylindrical end 22 moves out of engagement with the flat surface 39 of the blocking member 33 and moves into engagement with the sliding spacer 24, and both the enlarged cylindrical end 22 and the sliding spacer 24 are temporarily aligned with now slot 36 in acceptable blocking member 33. If, however, at the time of their alignment with the slot 36 there is still sufficient workpiece resistance between the workpiece 16 and the receiving member 38 to ensure an adequate press fit, the workpiece 16 will not yet have moved leftwardly into the receiving member 38 a significant and predetermined distance, and therefore the shaft 11 and the spacer 13 will not have moved leftwardly, and the spacer 13 will continue to engage the flat surface 41 of the blocking member 33 and hold the blocking member 33 against the urging of the leaf spring 34. Continued leftward movement of the housing 21 operates to further compress the coil spring 26 to apply a further increasing insertion force, until the sliding spacer 24 is brought into engagement with a flat surface 43 of the blocking member 33 on the opposite side of the slot 36 from the flat surface 39, as is best shown in FIG. 2 of the drawings. At this point, the workpiece has passed the minimum force test and is not known to be acceptable for completion of the inserting operation.

Shortly after the time when the spacer 24 engages the surface 43, it also engages the sleeve 14 of the spacer 13. Thereafter there is a direct positive drive between the force applied by the solenoid 42 and the shaft 11, and the workpiece 16 is thereafter driven into the receiving member 38 to effect a press fit. This is the second, or insertion, phase of the operation. As the workpiece 16 is driven into the receiving member 38, the spacer 13 is moved into alignment with the slot 37 of the blocking member 33. However, in this instance, when the spacer 13 is in alignment with the slot 37, the blocking member 33 continues to be held out by the engagement of the sliding spacer 24 with the flat surface 43 of the blocking member 33. Insertion of the workpiece 16 stops when the left surface of the spacer 13 engages the right surface of the mounting member 17.

As the housing engaging member 27 and the housing 21 move leftward prior to engagement of the sliding spacer 24 with the sleeve 14 of the spacer 13, the progressively increasing force applied to the workpiece 16 by the shaft 11 essentially consists of the force exerted by the coil spring 26 on the spacer 13, minus the drag force exerted on the shaft 11 by a drag screw 40. The drag screw 40 is preferably made from a slightly resilient material such as nylon and is threaded into the mounting member 17 and into forceful engagement with the shaft 11. By adjusting the force of the engagement of the drag screw 40 with the shaft 11, the force to be exerted on the workpiece 16 in response to a particular force exerted on the shaft 11 by the spacer 13 may be determined. In other words, a predetermined compression of the spring 26 may be required for a particular chosen force to be applied to the workpiece 16 by the shaft 11.

The force exerted by the spring 26 may be expressed as the product of the distance it is compressed and its spring constant, plus any precompressive force which may exist in the spring while the tool 10 is in its normally retracted position. As shown in FIG. 1 of the drawings, it is necessary for the sliding spacer 24, when the tool 10 is in its retracted position, to move a distance Y (shown as the distance between a side 46 of the slot 36 and the left side of the sliding spacer 24) before engaging the surface 43 of the blocking member 33. Therefore, the force exerted on the workpiece 16 by the shaft 11 at the instant the sliding spacer 24 is about to engage the surface 43 of the blocking member 33 is equal to the product of the distance Y and the spring constant of the coil spring 26 plus any initial force exerted by the coil spring 26 as a result of precompression when the tool 10 is in its normally retracted position minus the drag force exerted on the shaft 11 by the drag screw 40. If the spring 26 and the force of the engagement of the drag screw 40 with the shaft 11 is chosen so that the force exerted on the workpiece 16 when the sliding spacer 24 is about to engage the surface 43 is equal to the minimum desired insertion force to ensure an acceptable press fit, then if such minimum insertion force exists between the workpiece 16 and the receiving member 38, the shaft 11 will not move significantly leftward to insert the workpiece 16, and therefore the spacer 13 will not move out of engagement with the flat surface 41 of the blocking member 33, until the sliding spacer 24 has moved into engagement with the flat surface 43 of the blocking member 33. Therefore, if sufficient force is required to insert the particular workpiece 16 a significant distance into the receiving member 38 to ensure an acceptable retention force between the two parts after the press fit has been effected, the blocking lever 33 will at all times during the insertion operation be prevented from moving upwardly under the urging of the leaf spring 34 by the engagement of either the spacer 13, the sliding spacer 24, or the enlarged cylindrical end portion 22 of the housing 21, with a surface of the blocking member 33. Thus, the blocking member 33 operates to sense whether the workpiece 16 has moved substantially as a result of the initial force and to permit completion of the insertion operation whenever no substantial movement has occurred.

To return the tool 10 to its retracted position following the insertion of the workpiece 16 into the receiving member 38, the force applied by the solenoid 42 to the handle 31 is reversed, thereby moving the driver shaft 29, the housing engaging member 27 and the housing 21 rightwardly as shown in the drawings. As the housing 21 moves to the right, the sliding spacer 24, which is in engagement with the flat surface 43 of the blocking member 33 as a result of the insertion operation, moves to the right under the urging of the spring 26 until it engages the left end of the sleeve 12 which is being urged leftwardly by the spring 32, and held immobile against the urging of the sliding spacer 24 by the spring 32 and the drag screw 40. The sliding spacer 24 then remains in engagement with the flat surface 43 of the blocking member 33 until the enlarged cylindrical end 22 of the housing 21 has reengaged the flat surface 39 as the housing moves rightwardly. Shortly after the enlarged cylindrical end 22 returns into engagement with the flat surface 39, the right end 44 of the housing 21 engages the flat washer 18, thereby directly driving the shaft 11, and therefore the spacer 13 and the spacer 24 rightwardly, allowing the spacer 13 to be returned into engagement with the flat surface 41, and forcing the sliding spacer 24 out of engagement with the flat surface 43. At this point the tool 10 has been returned to its normal retracted position and is ready to perform another insertion operation. During retraction of the tool rightwardly, the coil spring 32 and the drag screw 40 operated to ensure that the shaft 11 would not return to its original position until the enlarged cylindrical end 22 of the housing 21 had moved into engagement with the flat surface 39 of the blocking lever 33.

To illustrate how the tool operates to immobilize itself if an unacceptable press fit between the workpiece 16 and the receiving member 38 would result from an insertion operation, assume that the force required to insert the workpiece 16 into the receiving member 38 the predetermined distance is less than that required to ensure an acceptable press fit. As a force is applied by the solenoid 42 to the handle 31 to insert the workpiece 16, the housing 21 with its enlarged cylindrical end 22 will move leftward as before, engaging the spacer 24, and a gradually increasing force will again be transmitted to the workpiece 16 through the shaft 11. This force, as described above, is a function of the state of compression of the coil spring 26. If insufficient insertion resistance is offered by the workpiece 16 to the shaft 11, so that the workpiece 16 begins to significantly move into the receiving member 38 before the sliding spacer 24 has moved into engagement with the flat surface 43 of the blocking member 33, the spacer 13 will move out of engagement with the flat surface 41 of the blocking member 33 before the sliding spacer 24 moves into engagement with the flat surface 43 of the blocking member 33. As a result, the blocking member 33 will be urged upward by the leaf spring 34, as viewed in the drawings, to allow the enlarged cylindrical end 22 of the housing 21, and the sliding spacer 24, to be accommodated within the slot 36, and to allow the spacer 13 to be accommodated within the slot 37. This arrests the leftward movement of the sliding spacer 24, and therefore the tool 10, by engaging the sliding spacer 24 with a side 46 of the slot 36. Therefore, leftward movement of the tool will be arrested by the time that the sliding spacer 24 has moved the distance Y, and immobilization of the tool 10 prevents further insertion of the workpiece 16 into the receiving material 38 and indicates what would be an unacceptable press fit if the insertion operation were completed. Thus the blocking member 33 senses that the workpiece 16 has moved substantially and prevents completion of the insertion operation.

Once the tool has been immobilized, it may be returned to its normally retracted position, and the defective workpiece 16 may be removed from its partially inserted position. Before the tool can be retracted, the blocking member is first withdrawn from its engagement with the enlarged cylindrical end 22, the sliding spacer 24, and the spacer 13. The blocking member 33 may be withdrawn, against the urging of the leaf spring 34, by any suitable means, such as a solenoid 47. Then, the tool is retracted by reversing the solenoid 42 as previously described.

While only one specific embodiment of the invention has been described in detail, it will be obvious that various modifications may be made from the specific details described without departing from the spirit and scope of the invention. For example, it is not necessary for the tool 10 to be used to press fit workpieces into a workpiece receiving member. The tool 10 may be used, for example, to apply a pushing force to any object which must be capable of remaining immovable, or moving only a predetermined amount, while being acted upon by a minimum predetermined force. Also, since the minimum force to be withstood by the object to be tested is determined by the initial state of compression of the spring, the spring constant of the spring, the distance Y, and the drag force exerted on the shaft by the drag screw, means may be provided to allow varying one or more of the aforementioned three factors in determining the minimum insertion force, to allow a large range of minimum insertion forces to be tested by the same tool. For example, if the spacer 13 were threadably engaged with the shaft 11 the position of the spacer 13 on the shaft 11 could be adjusted to vary the spring force applied and to change the position of the spacer 13 with respect to the slot 37. For further control, a sliding member could be attached to the blocking member 33 to increase or to decrease the distance Y which the sliding spacer 24 must travel prior to engagement with the flat surface 43, or a clamping device could be installed on the spring 26 to clamp together two or more loops of the spring, and to thereby vary the initial precompression force provided by the spring. Also, a wide range of adjustment is provided by varying the engaging force between the drag screw 40 and the shaft 11.

What is claimed:

1. A self-testing tool for selectively force fitting a workpiece into a receiving member if a predetermined minimum holding strength will be exceeded for the fit, which comprises:
   a support;
   means, mounted on the support, for applying an initial force to the workpiece tending to urge it into the receiving member;
   means, responsive to the application of the initial force to the workpiece, for sensing whether the workpiece has moved substantially as a result of the operation of the means for applying the initial force; and means, responsive to the sensing means, for completing the insertion operation whenever the sensing means indicates no substantial movement, the means for applying the initial force being constructed to apply an initial force selected to insure that the minimum holding strength has been met.

2. A tool as recited in claim 1, wherein:
   the means for applying the initial force comprises a pushing member slidably mounted on the support, and means, mounted between a portion of the support and the pushing member, for urging the pushing member against the workpiece so as to tend to insert the workpiece;
   the means for completing the insertion operation includes means, mounted in the support for engagement with the pushing member, for applying increased force to the pushing member; and
   means are provided, mounted in the support for engagement with the pushing member, for immobilizing the pushing member in response to the sensing means if the workpiece has moved substantially as a result of the application of the initial force.

3. A tool for inserting a workpiece into a workpiece receiving member that offers resistance to such insertion, which comprises:
   a support;
   a member, mounted on the support, for pushing the workpiece into the receiving member;

means, mounted on the support and engaging the pushing member, for applying a force to the pushing member and thereby to the workpiece to insert the workpiece into the receiving member; and means, mounted on the support in engagement with the pushing member and responsive to a predetermined minimum pushing force required to push the workpiece a predetermined distance into the receiving member, for immobilizing the pushing member if the minimum force is not encountered, so that the workpiece will not be completely inserted into the receiving member in such a case.

4. A tool as recited in claim 3, wherein the means for immobilizing the pushing member comprises:

a blocking member mounted on the support in engagement with the pushing member; and means, mounted on the support and responsive to said minimum pushing force, for moving the blocking member into blocking engagement with the pushing member.

5. A tool as recited in claim 4, wherein the pushing member comprises;

a shaft for pushing the workpiece;

a housing comprising a portion of the support and slidably mounted on the shaft, to which the force is applied; and an elastic member mounted between a portion of the shaft and the housing and compressible to transmit a portion of the force applied to the housing to the shaft.

6. A tool as recited in claim 5, wherein:

the blocking member has a surface for normally engaging a portion of the housing, and has a slot in the surface to engage the housing to immobilize the housing;

compression of the elastic member as a result of a force on the housing greater than the predetermined minimum force required to insert the workpiece into the receiving member prevents the slot in the blocking member from engaging the housing; and a lesser compression of the elastic member as a result of workpiece insertion with less than the predetermined minimum force required allows the housing to be engaged and immobilized by the slot in the blocking member.

7. An insertion tool, which comprises:

a support;

a housing slidably mounted on the support for longitudinal movement along an axis;

a shaft having a portion slidably mounted within the housing for longitudinal movement along the same axis, said shaft having a spacer fixed thereto;

means, mounted on the support, for applying a force to the housing to move the housing in a first direction along said axis;

an elastic member mounted between the spacer and the housing and compressible to transmit a portion of the force applied to the housing to the spacer and therefore to the shaft so as to tend to move the shaft in the same direction as the housing with a force governed by the properties of the elastic member; and means, mounted on the support and responsive to relative longitudinal motion between the housing and the spacer in response to the force applied to the housing, for immobilizing the housing and preventing further movement thereof in response to the applied force.

8. A tool as recited in claim 7, wherein the elastic member comprises a coil spring.

9. A tool as recited in claim 7, wherein the means for immobilizing the housing comprises:

a movable blocking member mounted on the support for movement toward and away from the housing and normally positioned out of the path of movement of the housing; and means mounted on the support and responsive to the relative motion between the housing and the spacer for moving the blocking member into blocking engagement with the housing.

10. A tool as recited in claim 9, wherein the blocking member has a surface for normally engaging the housing and the spacer, and has a slot in the surface to engage the housing when the housing is immobilized.

11. A tool as recited in claim 10, wherein the simultaneous movement of both the housing and the spacer, as a result of the noncompression of the elastic member when a force is applied to the housing, allows the housing to be engaged by the slot in the blocking member; and wherein movement of the housing across the slot when a force is applied to the housing, prior to movement of the spacer as a result of the compression of the elastic member, prevents the housing from being engaged by the slot.

* * * * *

UNITED STATES PATENT OFFICE
CERTIFICATE OF CORRECTION

Patent No. 3,670,388          Dated June 20, 1972

Inventor(s) RONALD H. JACK

It is certified that error appears in the above-identified patent and that said Letters Patent are hereby corrected as shown below:

<u>Cover sheet of patent containing ABSTRACT</u>:

Change date patent issued from "June 20, 2972"

to --June 20, 1972--

Signed and sealed this 9th day of July 1974.

(SEAL)
Attest:

McCOY M. GIBSON, JR.          C. MARSHALL DANN
Attesting Officer             Commissioner of Patents